(12) United States Patent
Tsuga et al.

(10) Patent No.: US 10,396,389 B2
(45) Date of Patent: Aug. 27, 2019

(54) FUEL CELL STACK

(71) Applicant: NGK SPARK PLUG CO., LTD., Nagoya-shi (JP)

(72) Inventors: Shunsuke Tsuga, Aichi (JP); Takafumi Shichida, Kasugai (JP); Tetsuya Morikawa, Ichinomiya (JP); Nobuyuki Hotta, Konan (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 601 days.

(21) Appl. No.: 14/780,827

(22) PCT Filed: Feb. 5, 2014

(86) PCT No.: PCT/JP2014/052659
§ 371 (c)(1),
(2) Date: Sep. 28, 2015

(87) PCT Pub. No.: WO2014/156314
PCT Pub. Date: Oct. 2, 2014

(65) Prior Publication Data
US 2016/0056492 A1 Feb. 25, 2016

(30) Foreign Application Priority Data
Mar. 29, 2013 (JP) ................................. 2013-072922

(51) Int. Cl.
*H01M 8/04* (2016.01)
*H01M 8/2457* (2016.01)
(Continued)

(52) U.S. Cl.
CPC ....... *H01M 8/2457* (2016.02); *H01M 8/0258* (2013.01); *H01M 8/0267* (2013.01);
(Continued)

(58) Field of Classification Search
CPC ..... H01M 8/0414; H01M 8/2465-248; H01M 8/2425; H01M 8/04074; H01M 8/24; H01M 8/0258; H01M 8/241; H01M 8/04007; H01M 8/2483

USPC ......................................... 429/456–462, 434
See application file for complete search history.

(56) References Cited

U.S. PATENT DOCUMENTS

2004/0081872 A1* 4/2004 Herman ............ H01M 8/04014
429/413
2005/0014046 A1 1/2005 Tachtler et al.
(Continued)

FOREIGN PATENT DOCUMENTS

EP 1933407 A1 6/2008
JP 61-49382 A 3/1986
(Continued)

OTHER PUBLICATIONS

International Search Report dated Apr. 28, 2014 issued by International Searching Authority in counterpart International Application No. PCT/JP2014/052659 (PCT/ISA/210).

*Primary Examiner* — Miriam Stagg
*Assistant Examiner* — Claire L Roe
(74) *Attorney, Agent, or Firm* — Sughrue Mion, PLLC

(57) ABSTRACT

A fuel gas supply path in a fuel cell stack includes in series a first path, a second path, and a third path. In the second path, two inlets of the fuel gas in each of power generating cells included in the second path are located at a first position PA and a second position PB, and the position of one outlet of the fuel gas in each power generating cell is located at a third position PC. In the third path, an inlet of the fuel gas in each of power generating cells included in the third path is located at a position coinciding with the third position PC when the power generating cells are viewed in the stacking direction, and an outlet of the fuel gas in each power generating cell is located at a position between the first position PA and the second position PB.

10 Claims, 16 Drawing Sheets

(51) Int. Cl.
*H01M 8/241* (2016.01)
*H01M 8/247* (2016.01)
*H01M 8/0258* (2016.01)
*H01M 8/0267* (2016.01)
*H01M 8/04007* (2016.01)
*H01M 8/2483* (2016.01)
*H01M 8/2425* (2016.01)
*H01M 8/124* (2016.01)
*H01M 8/04014* (2016.01)
*H01M 8/2432* (2016.01)

(52) U.S. Cl.
CPC ....... *H01M 8/04074* (2013.01); *H01M 8/241* (2013.01); *H01M 8/247* (2013.01); *H01M 8/2425* (2013.01); *H01M 8/2483* (2016.02); *H01M 8/04022* (2013.01); *H01M 8/2432* (2016.02); *H01M 2008/1293* (2013.01)

(56) References Cited

U.S. PATENT DOCUMENTS

| | | | |
|---|---|---|---|
| 2006/0257709 | A1 | 11/2006 | Blum et al. |
| 2007/0042257 | A1* | 2/2007 | Chyou ................ H01M 8/0258 429/514 |
| 2011/0117466 | A1 | 5/2011 | Badding |
| 2015/0030949 | A1* | 1/2015 | Ishikawa ............ H01M 8/2425 429/434 |

FOREIGN PATENT DOCUMENTS

| | | | | |
|---|---|---|---|---|
| JP | 9-326259 A | 12/1997 | | |
| JP | 2005-5074 A | 1/2005 | | |
| JP | 2011-522375 A | 7/2011 | | |
| WO | 2008/071143 A1 | 6/2008 | | |
| WO | 2008/153073 A1 | 12/2008 | | |
| WO | 2013/038700 A1 | 3/2013 | | |
| WO | WO-2013065757 A1 * | 5/2013 | .......... H01M 8/2425 |
| WO | 2013/065757 A1 | 4/2014 | | |

* cited by examiner

US 10,396,389 B2

FUEL CELL STACK

CROSS REFERENCE TO RELATED APPLICATIONS

This international patent application claims priority from Japanese Patent Application No. 2013-72922 filed with the Japanese Patent Office on Mar. 29, 2013, and the entire contents of Japanese Patent Application No. 2013-72922 are incorporated by reference in this international application.

TECHNICAL FIELD

The present invention relates to a fuel cell stack.

BACKGROUND ART

One previously known fuel cell stack is a solid oxide fuel cell (hereinafter may be abbreviated as an SOFC) stack that uses a solid electrolyte (solid oxide).

In such an SOFC, a fuel cell (power generating cell) used as a power generating unit includes, for example: an anode provided on one side of a solid electrolyte membrane and in contact with fuel gas; and an oxidant electrode (cathode) provided on the other side and in contact with oxidant gas (air). In addition, a fuel cell stack including a plurality of power generating cells stacked through interconnectors has been developed in order to obtain a desired voltage.

Such a type of fuel cell stack has a problem in that the temperature of power generating cells in a central region with respect to the direction of stacking the power generating cells (stacking direction) is generally higher than the temperature of power generating cells in end regions.

One technique proposed in view of this problem is to supply cold air to one side surface of the fuel cell stack in the central region with respect to the stacking direction and also supply heat-exchanged hot gas to the end portions, with respect to the stacking direction, of the fuel cell stack (see Patent Document 1).

PRIOR ART DOCUMENT

Patent Document

Patent Document 1: Japanese Patent Application Laid-Open (kokai) No. 2005-5074

SUMMARY OF THE INVENTION

Problems to be Solved by the Invention

In the above conventional technique, the cold air is supplied to only one side surface of the fuel cell stack, and therefore the power generating cells in the central region, with respect to the stacking direction, of the fuel cell stack cannot be cooled sufficiently. Moreover, with the conventional technique, the utilization ratio of the fuel gas cannot be improved sufficiently.

One aspect of the present invention is to provide a fuel cell stack in which the cooling effect on the power generating cells is high and the utilization ratio of the fuel gas is high.

Means for Solving the Problems

A fuel cell stack of a first aspect of the present invention comprises a plurality of power generating cells stacked on one another; a heat exchange unit disposed between two of the power generating cells which are located adjacent to each other; a fuel gas supply path for supplying fuel gas to the power generating cells; and an oxidant gas supply path for supplying oxidant gas to the power generating cells. The fuel gas supply path includes, in series, a first path passing through the heat exchange unit, a second path passing in parallel through some of the plurality of power generating cells, and a third path passing in parallel through the remaining power generating cells. In the second path, when the power generating cells are viewed in a stacking direction thereof, two inlets of the fuel gas in each of the some power generating cells are located at a first position PA and a second position PB located along one side of each power generating cell, and one outlet of the fuel gas in each of the some power generating cells is located at a third position PC along another side of each power generating cell that is opposite the one side. In the third path, when the power generating cells are viewed in the stacking direction, an inlet of the fuel gas in each of the remaining power generating cells is located at a position coinciding with the third position PC, and an outlet of the fuel gas in each of the remaining power generating cells is located at a position between the first position PA and the second position PB.

A fuel cell stack of a second aspect of the present invention comprises a plurality of power generating cells stacked on one another; a heat exchange unit disposed at at least one of a position between two of the power generating cells which are located adjacent to each other and a position outside of one of the plurality of power generating cells that is located at an end in a stacking direction of the power generating cells; a fuel gas supply path for supplying fuel gas to the power generating cells; and an oxidant gas supply path for supplying oxidant gas to the power generating cells. The fuel gas supply path includes, in series, a first path passing through the heat exchange unit, a second path passing in parallel through some of the plurality of power generating cells, and a third path passing in parallel through the remaining power generating cells. In the second path, when the power generating cells are viewed in a stacking direction thereof, two inlets of the fuel gas in each of the some power generating cells are located at a first position PA and a second position PB located along one side of each power generating cell, and one outlet of the fuel gas in each of the some power generating cells is located at a third position PC along another side of each power generating cell that is opposite the one side. In the third path, when the power generating cells are viewed in the stacking direction, an inlet of the fuel gas in each of the remaining power generating cells is located at a position coinciding with the third position PC, and an outlet of the fuel gas in each of the remaining power generating cells is located at a position between the first position PA and the second position PB.

In the fuel cell stack of the first aspect of the present invention, the heat exchange unit is disposed between two power generating cells, and the power generating cells can be effectively cooled by causing the fuel gas to flow through the heat exchange unit.

In the fuel cell stack of the second aspect of the present invention, the heat exchange unit is disposed at at least one of a position between two power generating cells located adjacent to each other and a position outside of one of the plurality of power generating cells that is located at an end in the stacking direction, and the power generating cells can be effectively cooled by causing the fuel gas to flow through the heat exchange unit. The heat exchange unit is disposed at at least one of "a position between two power generating cells located adjacent to each other," "a position outside of the upper end, with respect to the stacking direction, of the power generating cells," and "a position outside of the lower end, with respect to the stacking direction, of the power generating cells." The heat exchange unit may be disposed at each of any two of the three positions or all the three positions.

In the fuel cell stacks of the first and second aspects of the present invention, the fuel gas supply path includes, in series, the first path, the second path through which the fuel gas flows in a parallel manner, and the third path through which the fuel gas flows in a parallel manner. Therefore, a high fuel utilization ratio can be achieved.

In the fuel cell stacks of the first and second aspects of the present invention, the inlets and outlets of the fuel gas in the second path and the third path are disposed at the above-described positions in the power generating cells. This allows the fuel gas to flow uniformly through the power generating cells, and therefore uniform power generation can be achieved.

In particular, as viewed in the stacking direction, the distance from the first position PA to the third position PC and the distance from the second position PB to the third position PC may be substantially the same. In this case, the flow of the fuel gas in the power generating cells becomes more uniform.

In the fuel cell stacks of the first and second aspects of the present invention, the fuel gas supply path may include a plurality of fuel gas passages extending within the fuel cell stack in the stacking direction, and connection ports that connect the fuel gas passages to the heat exchange unit and interiors of at least some of the plurality of power generating cells, and the inlets and the outlets may be part of the connection ports. In this case, common use of a manifold becomes possible, and the number of components can be reduced.

Further, the fuel cell stacks of the first and second aspects of the present invention may further comprise a plurality of bolts passing through the fuel cell stack in the stacking direction and used to fix the plurality of power generating cells and the heat exchange unit, wherein the plurality of fuel gas passage are cavities formed inside the plurality of bolts. In this case, since the fuel gas passages are present inside the bolts, the overall size of the fuel cell stack can be reduced.

DESCRIPTION OF REFERENCE NUMERALS

1: fuel cell stack, 1A, 1B: side, 3, 3A, 3B, 3C, 3D, 3E, 3F, 3G, 3H: power generating cell, 7: heat exchange unit, 8, 9: end plate, 11 to 18: hole, 19: nut, 21 to 28: bolt, 31 to 38: gas passage, 41: fuel gas passage, 43, 51, 53, 63, 69: inlet, 45, 47, 55, 59, 65, 71: outlet, 49: power 10 generating cell-fuel gas passage, 61: air passage, 67: power generating cell-air passage, 101: solid electrolyte, 103: anode, 105: cathode, 107: cell body, 109, 111: interconnector, 113, 119: gas seal member, 115: separator, 117: anode frame, 121: anode-side current collector, 123: cathode-side current collector, 125, 129, 135, 139, 142, 151, 151A, 151B, 157, 157A, 157B, 157C: hole, 127, 133, 137, 141: opening, 131, 143, 153, 154, 159, 160, 161: communication groove, 145: cathodeside member, 147: anode-side member, 149, 155: recess, 163, 165, 181: heater, 167: casing, 169: combustion catalyst, 171: space, 173: discharge tube, 174, 175, 177, 179: outlet

MODES FOR CARRYING OUT THE INVENTION

Embodiments of the present invention will be described with reference to the drawings.

<First Embodiment>

1. Overall Configuration of Fuel Cell Stack 1

The configuration of a fuel cell stack 1 will be described with reference to FIGS. 1 to 8. The fuel cell stack 1 is a solid oxide fuel cell stack and is a device that generates electric power using fuel gas (e.g., hydrogen) and air (corresponding to an example of the oxidant gas) supplied to the device.

Figure 1:
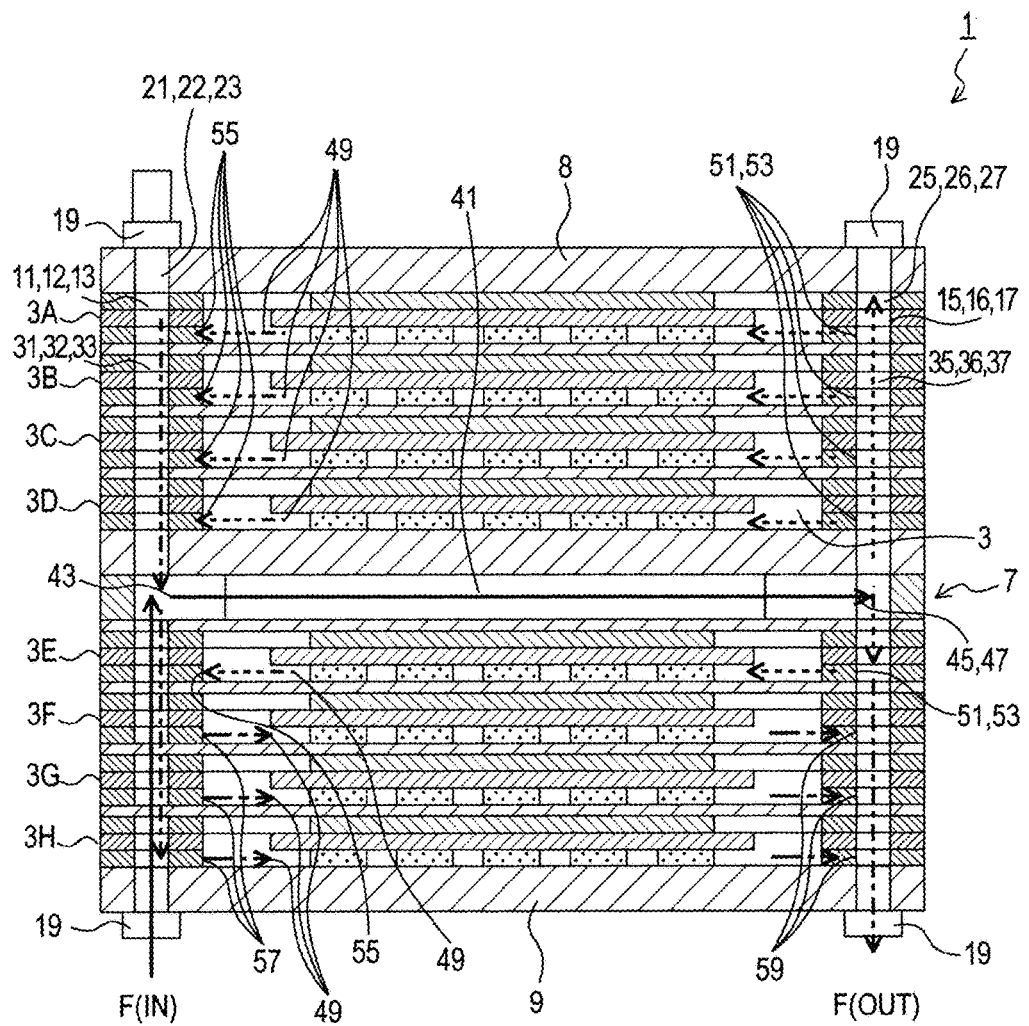
FIG. 1 Cross-sectional view showing the configuration of a fuel cell stack 1 in a first embodiment, illustrating the flow of fuel gas.
Figure 2:
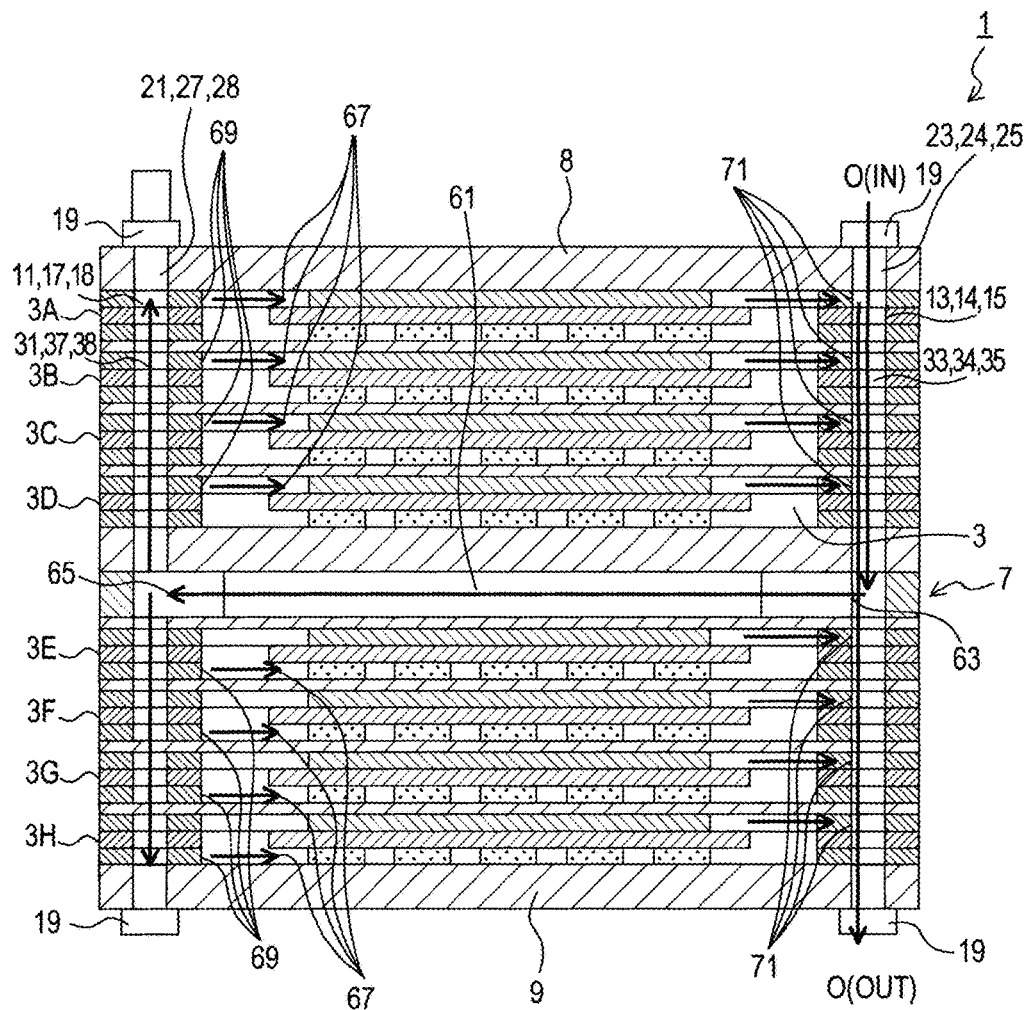
FIG. 2 Cross-sectional view showing the configuration of the fuel cell stack 1 in the first embodiment, illustrating the flow of air.

The fuel cell stack 1 has a structure in which flat plate-shaped fuel cells (hereinafter referred to as power generating cells) 3 serving as power generating units, a heat exchange unit 7, and a pair of end plates 8 and 9 are stacked as shown in FIGS. 1 and 2. There are eight power generating cells 3, and they are denoted by 3A, 3B, 3C, 3D, 3E, 3F, 3G, and 3H, respectively, from the top to the bottom in FIGS. 1 and 2.

The heat exchange unit 7 is located between the power generating cells 3D and 3E and in contact therewith. Specifically, four power generating cells 3 are stacked above the heat exchange unit 7, and four power generating cells 3 are stacked below the heat exchange unit 7.

The end plate 8 is located on the outer side of the power generating cell 3A (the upper side in FIGS. 1 and 2) and is in contact with the power generating cell 3A. The end plate 9 is located on the outer side of the power generating cell 3H (the lower side in FIGS. 1 and 2) and is in contact with the power generating cell 3H.

Figure 3:
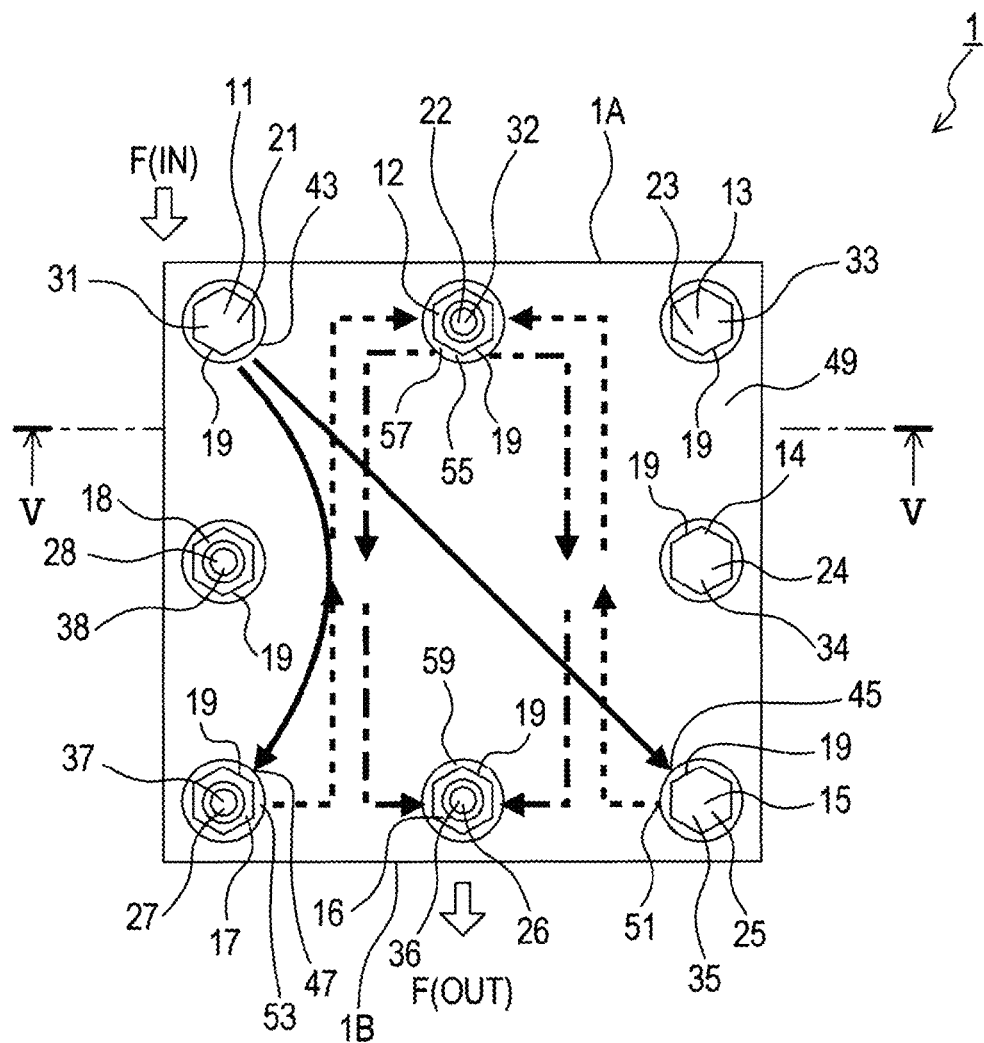
FIG. 3 Plan view showing the configuration of the fuel cell stack 1 in the first embodiment, illustrating the flow of fuel gas.
Figure 4:
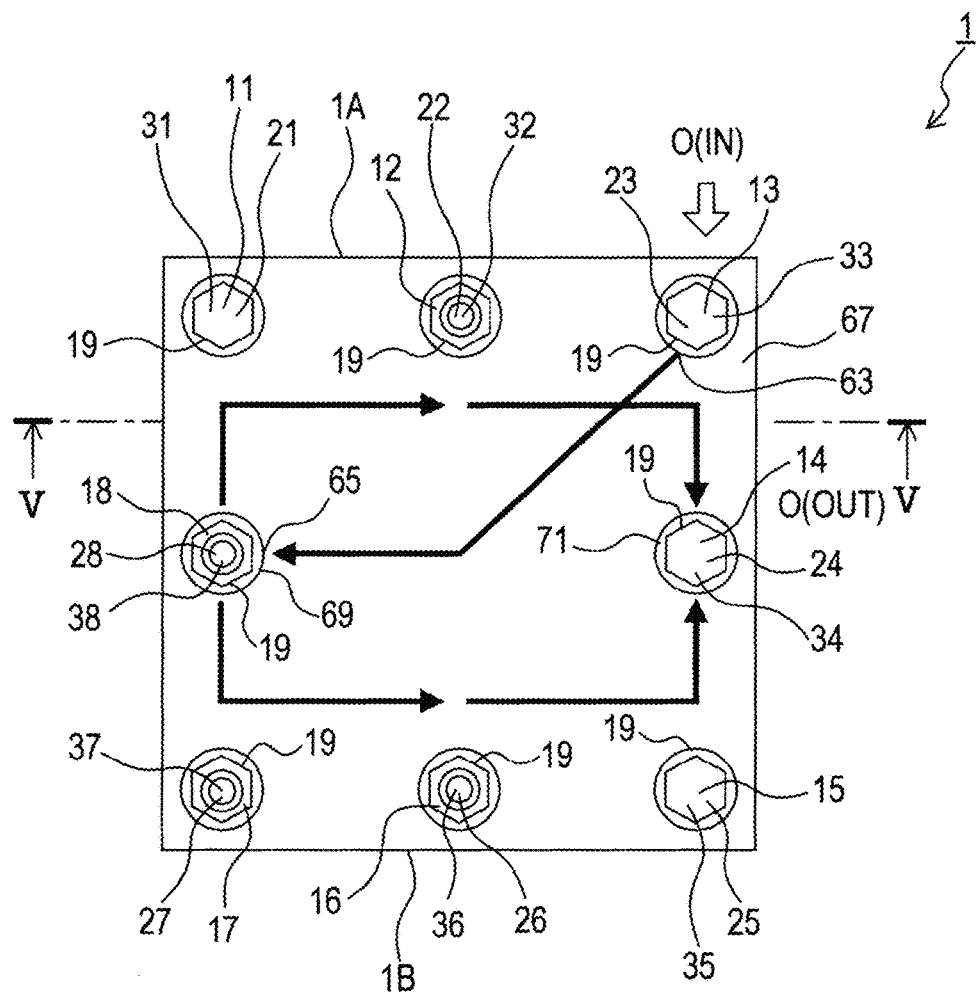
FIG. 4 Plan view showing the configuration of the fuel cell stack 1 in the first embodiment, illustrating the flow of air.

As shown in FIGS. 3 and 4, the fuel cell stack 1 (i.e., the power generating cells 3, the heat exchange unit 7, and the end plates 8 and 9) has a rectangular shape as viewed in the stacking direction of the power generating cells 3 (the vertical direction in FIGS. 1 and 2 and the direction perpendicular to the sheets in FIGS. 3 and 4).

The fuel cell stack 1 has eight holes 11 to 18 that extend therethrough in the stacking direction. The holes 11 to 18 are formed by holes provided in the power generating cells 3, the heat exchange unit 7, and the end plates 8 and 9 included in the fuel cell stack 1. When the fuel cell stack 1 is viewed in the stacking direction, the holes 11, 12, and 13 are formed at regular intervals along one side 1A which defines the outer shape of the fuel cell stack 1, and the hole 12 is located at the midpoint of the side 1A. The holes 15, 16, and 17 are formed at regular intervals along a side 1B opposite the side 1A, and the hole 16 is located at the midpoint between the holes 15 and 17.

A bolt 21 is inserted into the hole 11, and nuts 19 are screwed onto the opposite ends of the bolt 21. The bolt 21 extends in the stacking direction from one end of the fuel cell stack 1 to the other end. Similarly, bolts 22 to 28 are inserted into the holes 12 to 18, and nuts 19 are screwed onto the opposite ends of the bolts 22 to 28. The power generating cells 3 and the heat exchange unit 7 are fixed together by the bolts 21 to 28 and the nuts 19.

The bolts 21 to 28 have respective hollow gas passages 31 to 38 (gas passages composed of cavities) formed therein. The gas passages 31 to 38 extend from one ends of the bolts 21 to 28 to the other ends in their axial direction. The gas passages 31, 32, 35, 36, and 37 correspond to examples of the fuel gas passages.

Figure 7:
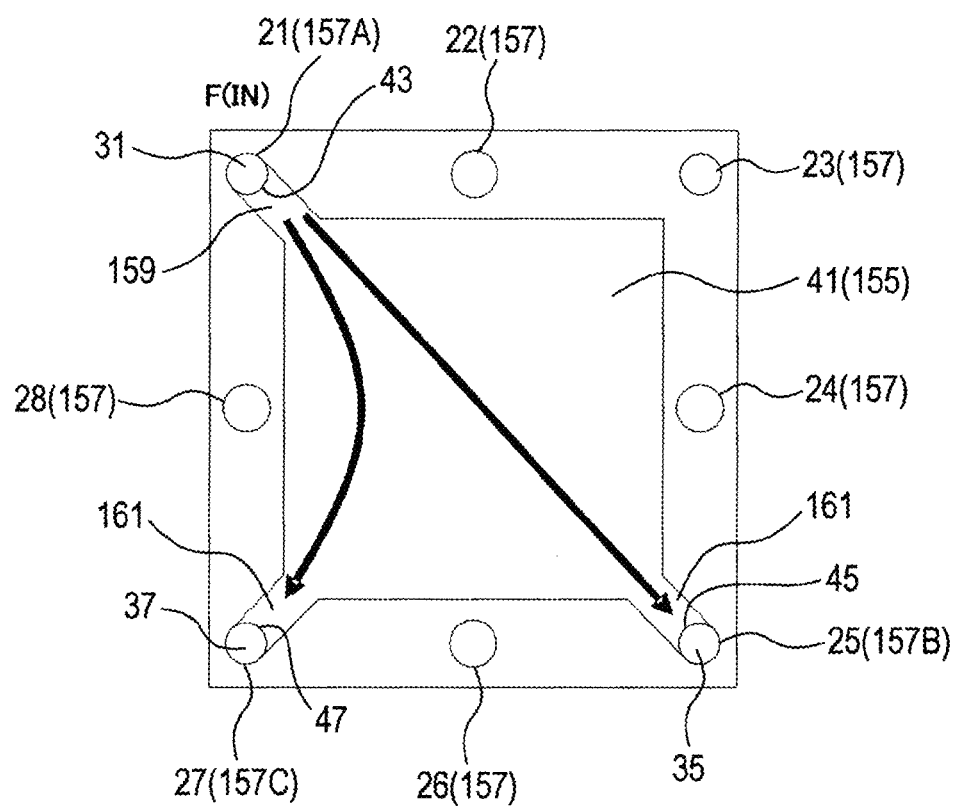
FIG. 7 Plan view showing the flow of fuel gas in the heat exchange unit 7.

The bolt 21 has an inlet 43 that is a hole extending from the gas passage 31 to the outer surface of the bolt 21 and connected to a fuel gas passage 41 (described later) in the heat exchange unit 7, as shown in FIGS. 1, 3, and 7.

The bolt 25 has an outlet 45 that is a hole extending from the gas passage 35 to the outer surface of the bolt 25 and connected to the fuel gas passage 41.

The bolt 27 has an outlet 47 that is a hole extending from the gas passage 37 to the outer surface of the bolt 27 and connected to the fuel gas passage 41.

The bolt 25 has five inlets 51 that are holes extending from the gas passage 35 to the outer surface of the bolt 25 as shown in FIGS. 1 and 3. The five inlets 51 are disposed at regular intervals in the vertical direction in FIG. 1 and are in communication with power generating cell-fuel gas passages 49 (described later) in the power generating cells 3A, 3B, 3C, 3D, and 3E.

The bolt 27 has five inlets 53 that are holes extending from the gas passage 37 to the outer surface of the bolt 27 as shown in FIGS. 1 and 3. The five inlets 53 are disposed at regular intervals in the vertical direction in FIG. 1 and are in communication with the power generating cell-fuel gas passages 49 in the power generating cells 3A, 3B, 3C, 3D, and 3E.

The bolt 22 has five outlets 55 that are holes extending from the gas passage 32 to the outer surface of the bolt 22 as shown in FIGS. 1 and 3. The five outlets 55 are disposed at regular intervals in the vertical direction in FIG. 1 and are in communication with the power generating cell-fuel gas passages 49 (described later) in the power generating cells 3A, 3B, 3C, 3D, and 3E.

The bolt 22 has three inlets 57 that are holes extending from the gas passage 32 to the outer surface of the bolt 22 as shown in FIGS. 1 and 3. The three inlets 57 are disposed at regular intervals in the vertical direction in FIG. 1 and are in communication with power generating cell-fuel gas passages 49 in the power generating cells 3F, 3G, and 3H.

The bolt 26 has three outlets 59 that are holes extending from the gas passage 36 to the outer surface of the bolt 26 as shown in FIGS. 1 and 3. The three outlets 59 are disposed at regular intervals in the vertical direction in FIG. 1 and are in communication with the power generating cell-fuel gas passages 49 in the power generating cells 3F, 3G, and 3H.

Figure 8:
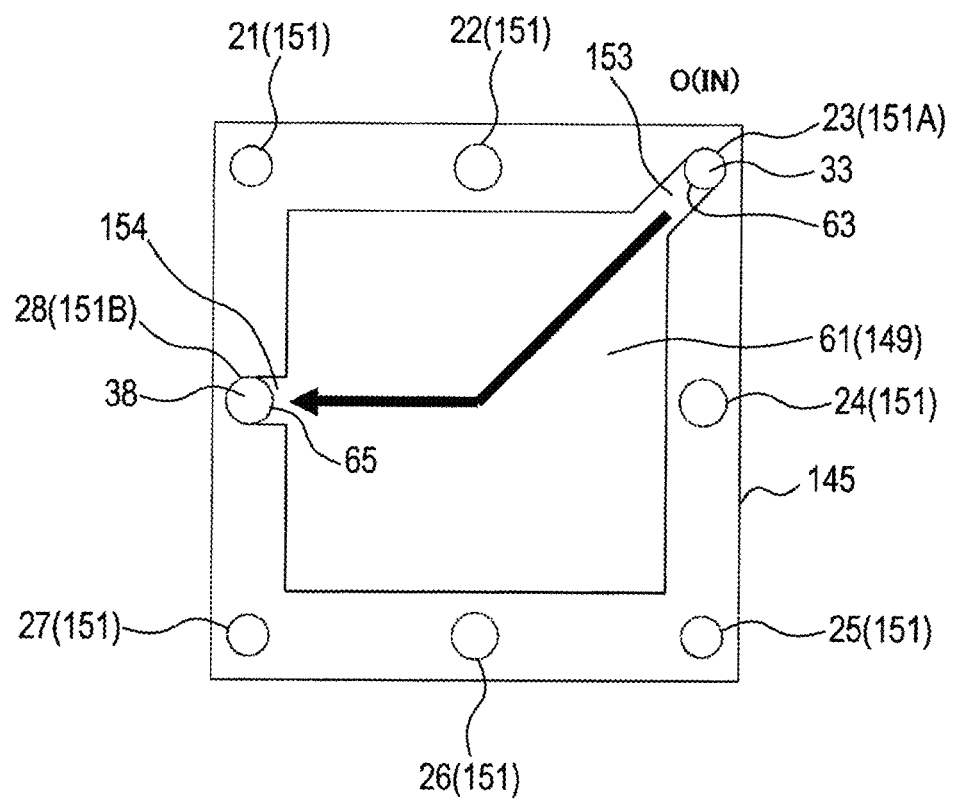
FIG. 8 Plan view showing the flow of air in the heat exchange unit 7.

The bolt 23 has an inlet 63 that is a hole extending from the gas passage 33 to the outer surface of the bolt 23 and connected to an air passage 61 (described later) in the heat exchange unit 7 as shown in FIGS. 2, 4, and 8. The bolt 28 has an outlet 65 that is a hole extending from the gas passage 38 to the outer surface of the bolt 28 and connected to the air passage 61.

The bolt 28 has eight inlets 69 that are holes extending from the gas passage 38 to the outer surface of the bolt 28 as shown in FIGS. 2, 4, and 8. The eight inlets 69 are disposed at prescribed intervals in the vertical direction in FIG. 1 and are in communication with power generating cell-air passages 67 (described later) in the power generating cells 3A, 3B, 3C, 3D, 3E, 3F, 3G, and 3H.

The bolt 24 has eight outlets 71 that are holes extending from the gas passage 34 to the outer surface of the bolt 24 as shown in FIGS. 2, 4, and 8. The eight outlets 71 are disposed at prescribed intervals in the vertical direction in FIG. 2 and are in communication with the power generating cell-air passages 67 in the power generating cells 3A, 3B, 3C, 3D, 3E, 3F, 3G, and 3H. The above-described outlets and inlets correspond to examples of the connection ports.

2. Configuration of Power Generating Cells 3

Figure 5:
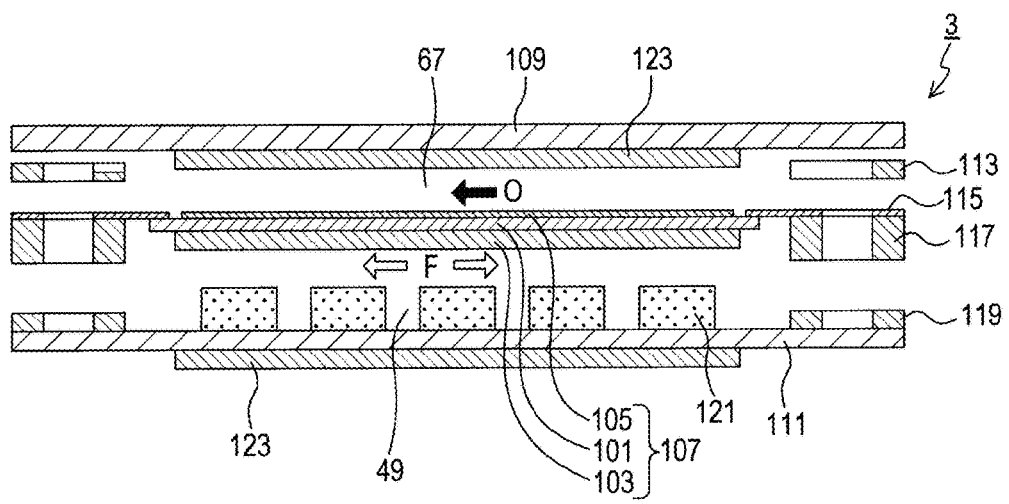
FIG. 5 Cross-sectional view of a power generating cell 3 in a V-V cross section in FIGS. 3 and 4.
Figure 6:
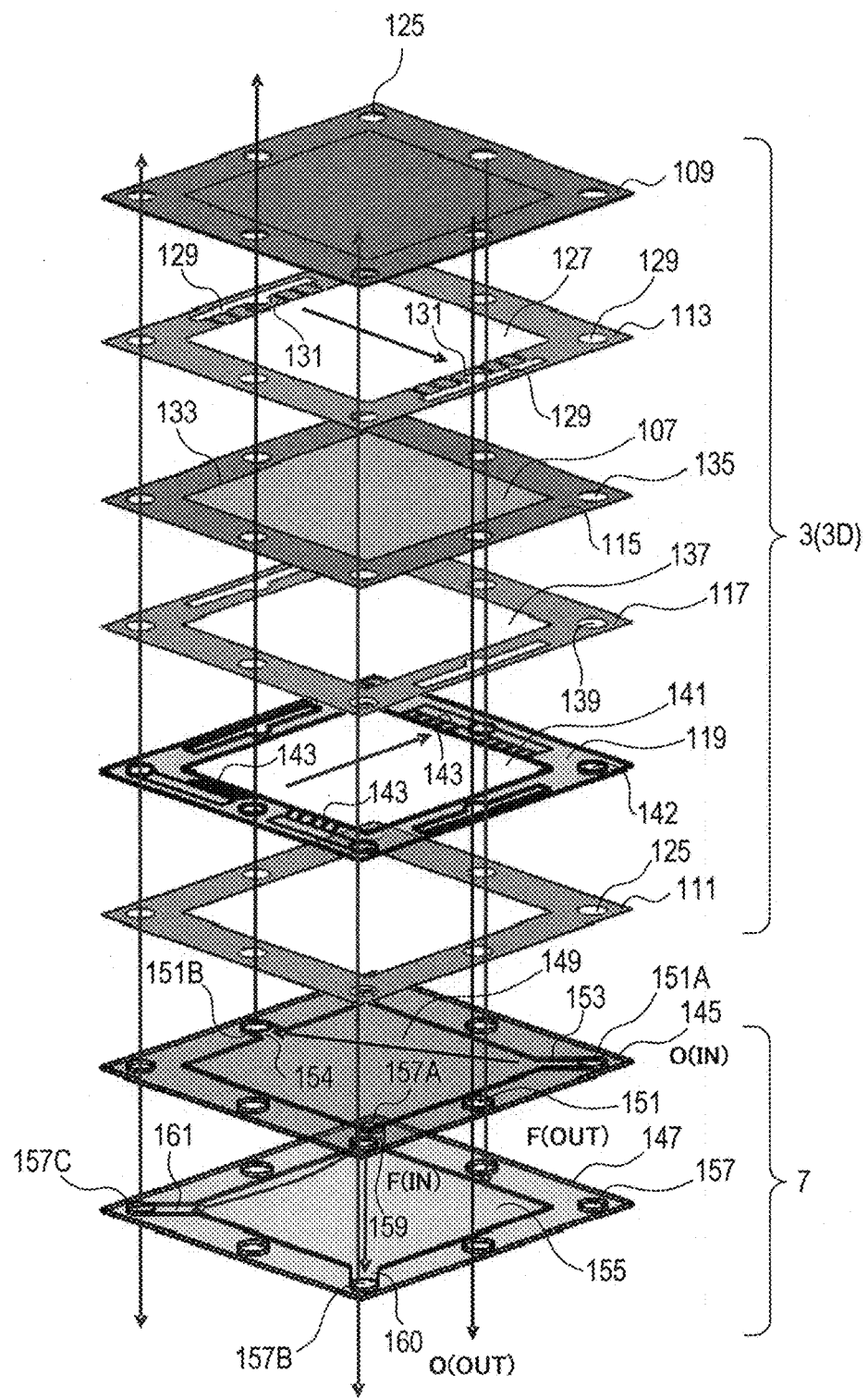
FIG. 6 Exploded view showing the configuration of a power generating cell 3D and a heat exchange unit 7.

The configuration of the power generating cells 3 will be described with reference to FIGS. 5 and 6. FIG. 6 shows the configuration of the power generating cell 3D included in the power generating cells 3. The power generating cells 3 are plate-shaped cells of the so-called anode-supporting film type. Each of the power generating cells 3 includes a thin-film solid electrolyte 101, an anode 103, and a thin film cathode 105, the anode 103 and the cathode 105 being formed on opposite sides of the solid electrolyte 101. In the following description, the solid electrolyte 101, the anode 103, and the cathode 105 are collectively referred to as a cell body 107. A power generating cell-air passage 67 is present on the cathode 105 side of the cell body 107, and a power generating cell-fuel gas passage 49 is present on the anode 103 side.

Each of the power generating cells 3 further includes paired upper and lower interconnectors 109 and 111; a plate-shaped gas seal member 113 disposed on the cathode 105 side; a separator 115 that is joined to the upper surface of the outer edge portion of the cell body 107 to isolate the power generating cell-air passage 67 and the power generating cell-fuel gas passage 49 from each other; an anode frame 117 disposed on the power generating cell-fuel gas passages 49 side; and a gas seal member 119 disposed on the anode 103 side. These members are stacked integrally.

An anode-side current collector 121 is disposed between the anode 103 and the interconnector 111 within the power generating cell 3, and a cathode-side current collector 123 is formed on the surface of the interconnector 109 so as to be integrated therewith.

The material used for the solid electrolyte 101 may be YSZ, ScSZ, SDC, GDC, a perovskite-type oxide, etc. A cermet formed from N, Ni, and a ceramic can be used for the anode 103, and a perovskite-type oxide and a cermet formed from a noble metal and a ceramic can be used for the cathode 105.

The interconnectors 109 and 111 are plate-shaped members formed from ferrite-based stainless steel, and eight holes 125 corresponding to the holes 11 to 18 are formed in the outer edge portions of the interconnectors 109 and 111.

The gas seal member 113 is a frame-shaped plate member having a square opening 127 at its center and formed from mica or vermiculite, and eight holes 129 corresponding to the holes 11 to 18 are formed in the outer edge portions of the gas seal member 113. Two of the holes 129 that correspond to the holes 14 and 18 are in communication with the opening 127 through communication grooves 131. The communication grooves 131 are not grooves penetrating through the gas seal member 113 in its thickness direction but grooves formed by carving one surface of the gas seal member 113. The communication grooves 131 can be formed by laser processing or press working.

The separator 115 is a frame-shaped plate member having a square opening 133 at its center and formed from ferrite-based stainless steel. The cell body 107 is joined to the separator 115 so as to close the opening 133. The separator 115 also has eight holes 135 corresponding to the holes 11 to 18 in its outer edge portions.

The anode frame 117 is a frame-shaped plate member having an opening 137 at its center and formed from ferrite-based stainless steel. The anode frame 117 also has eight holes 139 corresponding to the holes 11 to 18 on its outer edge portions.

The gas seal member 119 is a frame-shaped plate member having a square opening 141 at its center and formed from mica or vermiculite, and eight holes 142 corresponding to the holes 11 to 18 are formed in the outer edge portions of the gas seal member 119. In the power generating cells 3A, 3B, 3C, 3D, and 3E, three of the holes 142 that correspond to the holes 12, 15, and 17 are in communication with the opening 141 through communication grooves 143. In the power generating cells 3F, 3G, and 3H, two of the holes 142 that correspond to the holes 12 and 16 are in communication with the opening 141 through communication grooves 143. These communication grooves 143 are not grooves penetrating through the gas seal member 119 in its thickness direction but grooves formed by carving one surface of the gas seal member 119. The communication grooves 143 can be formed by laser processing or press working.

3. Configuration of Heat Exchange Unit 7

The configuration of the heat exchange unit 7 will be described with reference to FIGS. 6 to 8. The heat exchange unit 7 includes a cathode-side member 145 and an anode-side member 147. The cathode-side member 145 is a plate-shaped member adjacent to the power generating cell 3D and has a square recess 149 at the center of the surface facing the power generating cell 3D. Eight holes 151 corresponding to the holes 11 to 18 are formed in the outer edge portions of the cathode-side member 145. Two of the holes 151, i.e., holes 151A and 151B, corresponding to the holes 13 and 18 are in communication with the recess 149 through communication grooves 153 and 154. The recess 149 and the communication grooves 153 and 154 do not penetrate through the cathode-side member 145 in its thickness direction and are formed by carving the surface facing the power generating cell 3D.

The anode-side member 147 is a plate-shaped member that is in contact with the cathode-side member 145 on one side and in contact with the power generating cell 3E on the other side. The anode-side member 147 has a square recess 155 at the center of the surface facing the cathode-side member 145. Eight holes 157 corresponding to the holes 11 to 18 are formed in the outer edge portions of the anode-side member 147. Three of the holes 157, i.e., holes 157A, 157B, and 157C, corresponding to the holes 11, 15, and 17 are in communication with the recess 155 through communication grooves 159, 160, and 161. The recess 155 and the communication grooves 159, 160, and 161 do not penetrate through the anode-side member 147 in its thickness direction and are formed by carving the surface facing the cathode-side member 145.

When the cathode-side member 145 is joined to the power generating cell 3D, in a region where the recess 149, the holes 151, and the communication grooves 153 and 154 are not present, the surface of the cathode-side member 145 that faces the power generating cell 3D comes into contact with the power generating cell 3D. The air passage 61, which is a closed space extending from the hole 151A through the communication groove 153, the recess 149, and the communication groove 154 to the hole 151B, is thereby formed between the cathode-side member 145 and the power generating cell 3D. As described above, the air passage 61 is in communication with the gas passage 33 through the inlet 63 at the hole 151A (the hole 13) and in communication with the gas passage 38 through the outlet 65 at the hole 151B (the hole 18).

When the anode-side member 147 is joined to the cathode-side member 145, in a region where the recess 155, the holes 157, and the communication grooves 159, 160, and 161 are not present, the surface of the anode-side member 147 that faces the cathode-side member 145 comes into contact with the cathode-side member 145. The fuel gas passage 41 is thereby formed between the anode-side member 147 and the cathode-side member 145. The fuel gas passage 41 is a closed space extending from the hole 157A through the communication groove 159, the recess 155, and the communication groove 160 to the hole 157B and also extending from the hole 157A through the communication groove 159, the recess 155, and the communication groove 161 to the hole 157C. As described above, the fuel gas passage 41 is in communication with the gas passage 31 through the inlet 43 at the hole 157A (the hole 11) and in communication with the gas passages 35 and 37 through the outlets 45 and 47 at the hole 157B (the hole 15) and the hole 157C (the hole 17), respectively.

4. Method of Producing Fuel Cell Stack 1

A method of producing the fuel cell stack 1 will be described. First, the interconnectors 109 and 111, the separator 115, and the anode frame 117 that have the above-described shapes are formed by punching them from a ferrite-based stainless steel plate. The gas seal members 113 and 119 having the above-described shapes are formed by cutting them from a sheet formed of mica or vermiculite.

Next, the cell body 107 is formed using a well-known method. Specifically, a green sheet which is to become the solid electrolyte 101 is placed on a green sheet which is to become the anode 103, and the resultant laminate is fired. Then a material forming the cathode 105 is printed on the solid electrolyte 101 and then fired to thereby form the cell body 107. The cell body 107 is joined to the separator 115 so as to close the opening 133 of the separator 115. The cell body 107 is joined to the separator 115 by brazing.

Next, as shown in FIG. 6, the interconnector 109, the gas seal member 113, the separator 115 with the cell body 107 joined thereto, the anode frame 117, the gas seal member 119, and the interconnector 111 are stacked and integrated, whereby a power generating cell 3 is completed.

Eight power generating cells 3, the heat exchange unit 7, and the end plates 8 and 9 are stacked in the order shown in FIGS. 1 and 2. Then the bolts 21 to 28 are inserted into the holes 11 to 18, and the nuts 19 are screwed onto the opposite ends of the bolts 21 to 28, whereby the fuel cell stack 1 is completed.

5. Flow of Fuel Gas and Flow of Oxidant Gas

First, the flow of fuel gas will be described. Arrows in FIGS. 1, 3, and 7 indicate the flow of the fuel gas. Solid arrows indicate the flow of the fuel gas in a first path, and dotted arrows indicate the flow of the fuel gas in a second path. Dash-dotted arrows indicate the flow of the fuel gas in a third path.

As shown in FIGS. 1 and 3, the fuel gas is introduced from an end portion (denoted by F(IN) in FIGS. 1 and 3) of the passage 31 at the power generating cell 3H, passes through the passage 31, and enters the fuel gas passage 41 in the heat exchange unit 7 through the inlet 43. Then, as shown in FIG. 7, the fuel gas flows inside the fuel gas passage 41, enters the passage 35 through the outlet 45, and also enters the passage 37 through the outlet 47.

As shown in FIGS. 1 and 3, the fuel gas entering the passage 35 flows inside the passage 35, passes through the five inlets 51 (i.e., is split), and enters the power generating cell-fuel gas passages 49 in the power generating cells 3A, 3B, 3C, 3D, and 3E. The fuel gas entering the passage 37 passes through the five inlets 53 (i.e., is split) and enters the power generating cell-fuel gas passages 49 in the power generating cells 3A, 3B, 3C, 3D, and 3E.

As shown in FIG. 3, the fuel gas then flows in parallel through the power generating cell-fuel gas passages 49 in the power generating cells 3A, 3B, 3C, 3D, and 3E and enters the passage 32 through the five outlets 55.

Then the fuel gas passes through the passage 32, passes through the three inlets 57 (i.e., is split), and enters the power generating cell-fuel gas passages 49 in the power generating cells 3F, 3G, and 3H. As shown in FIG. 3, the fuel gas flows in parallel through the power generating cell-fuel gas passages 49 in the power generating cells 3F, 3G, and 3H and enters the passage 36 through the three outlets 59.

Then the fuel gas is discharged from an end portion (denoted by F(OUT) in FIGS. 1 and 3) of the passage 36 at the power generating cell 3H.

The above-described path of the fuel gas corresponds to an example of the fuel gas supply path. In the above-described path of the flow of the fuel gas, a section in which the fuel gas flows inside the fuel gas passage 41 in the heat exchange unit 7 corresponds to an example of the first path. In the above-described path of the flow of the fuel gas, a section in which the fuel gas enters the power generating cell-fuel gas passages 49 in the power generating cells 3A, 3B, 3C, 3D, and 3E through the passages 35 and 37, flows through the power generating cell-fuel gas passages 49 to the passage 32 corresponds to an example of the second path. In the above-described path of the flow of the fuel gas, a section in which the fuel gas enters the power generating cell-fuel gas passages 49 in the power generating cells 3F, 3G, and 3H through the passage 32 and flows through the power generating cell-fuel gas passages 49 to the passage 36 corresponds to an example of the third path.

As described above, the arrows in FIGS. 1, 3, and 7 indicate the flow of the fuel gas. The solid arrows indicate the flow of the fuel gas in the first path, and the dotted arrows indicate the flow of the fuel gas in the second path. The dash-dotted arrows indicate the flow of the fuel gas in the third path.

Specifically, the above-described path of the flow of the fuel gas includes, in series, the first path, the second path, and the third path. The term "in series" means that the fuel gas flows through the first path, second path, and third path in this order.

Next, the flow of air will be described. As shown in FIGS. 2 and 4, the air is introduced from an end portion (denoted by O(IN) in FIGS. 2 and 4) of the passage 33 at the power generating cell 3A, passes through the passage 33, and enters the air passage 61 in the heat exchange unit 7 through the inlet 63. Then, as shown in FIG. 8, the air flows inside the air passage 61 and enters the gas passage 38 through the outlet 65.

As shown in FIGS. 2 and 4, the air entering the gas passage 38 flows inside the gas passage 38 and enters the power generating cell-air passages 67 in the power generating cells 3 through the eight inlets 69. Then, as shown in FIGS. 2 and 4, the air flows in parallel through the power generating cell-air passages 67 in the power generating cells 3 and enters the gas passage 34 through the eight outlets 71. Then the air is discharged from an end portion (denoted by O(OUT) in FIGS. 2 and 4) of the gas passage 34 at the power generating cell 3H. The above-described path of the flow of the air corresponds to an example of the oxidant gas supply path. Arrows in FIGS. 2, 4, and 8 indicates the flow of the air.

6. Effects Obtained by Fuel Cell Stack 1

(1) In the fuel cell stack 1, the heat exchange unit 7 is disposed between the two adjacent power generating cells 3D and 3E, and the fuel gas can be introduced to the heat exchange unit 7. This allows the power generating cells 3 to be cooled efficiently. Particularly, since the heat exchange unit 7 is disposed near the center of the fuel cell stack 1 in which heat tends to be accumulated, the power generating cells 3 can be more effectively cooled.

(2) In the second path, inlets of the fuel gas in the power generating cells 3A, 3B, 3C, 3D, and 3E are the inlets 51 and 53 formed in the bolts 25 and 27, and outlets of the fuel gas in the power generating cells 3A, 3B, 3C, 3D, and 3E are the outlets 55 formed in the bolt 22.

In the third path, inlets of the fuel gas in the power generating cells 3F, 3G, and 3H are the inlets 57 formed in the bolt 22, and outlets of the fuel gas in the power generating cells 3F, 3G, and 3H are the outlets 59 formed in the bolt 26.

When the power generating cells 3 are viewed in the stacking direction, the inlets 51 and 53 are located at two positions disposed along the side 1B of each power generating cell 3, and the outlets 55 are located near the side 1A opposite the side 1B. As viewed in the stacking direction, the inlets 57 are located at a position coinciding with the position of the outlets 55, and the outlets 59 are located at the midpoint between the inlets 51 and 53. The positions of the inlets 51 and 53 correspond to examples of the first position PA and the second position PB, and the position of the outlets 55 and the inlets 57 corresponds to an example of the third position PC. The side 1B corresponds to an example of the one side having the first position PA and the second position PB, and the side 1A corresponds to an example of "the side opposite the one side."

When the inlets 51, 53, and 57 and the outlets 55 and 59 are arranged as described above, the fuel gas is allowed to flow through the power generating cells uniformly, so that electric power can be generated uniformly in the power generating cells. Particularly, when the power generating cells are viewed in the stacking direction, the distance from the first position PA to the third position PC and the distance from the second position PB to the third position PC are the same. This allows the fuel gas to flow through each of the power generating cells more uniformly.

In addition, stagnation of the fuel gas in the power generating cells 3 can be suppressed. Moreover, the number of bolts each having the passage of the fuel gas can be reduced.

(3) The fuel cell stack 1 has the fuel gas supply path that includes, in series, the first path, the second path through which the fuel gas flow in a parallel manner, and the third path through which the fuel gas flow in a parallel manner. Therefore, a high fuel utilization ratio is achieved. (4) In the fuel cell stack 1, the fuel gas supply path is composed of a plurality of gas passages 31, 32, 35, 36, and 37 extending through the fuel cell stack 1 in the stacking direction and connection ports (the inlets 43, 51, 53, and 57 and the outlets 45, 47, 55, and 59) for connecting the gas passages 31, 32, 35, 36, and 37 to the power generating cells or the heat exchange unit 7. Therefore, common use of a manifold becomes possible, and the number of components can be reduced.

<Second embodiment>

1. Configuration of fuel cell stack 1

The configuration of a fuel cell stack 1 is basically the same as that in the first embodiment but is partially different. The differences will be mainly described with reference to FIGS. 9 to 12, and the description of components similar to those in the first embodiment will be omitted or simplified.

Figure 9:
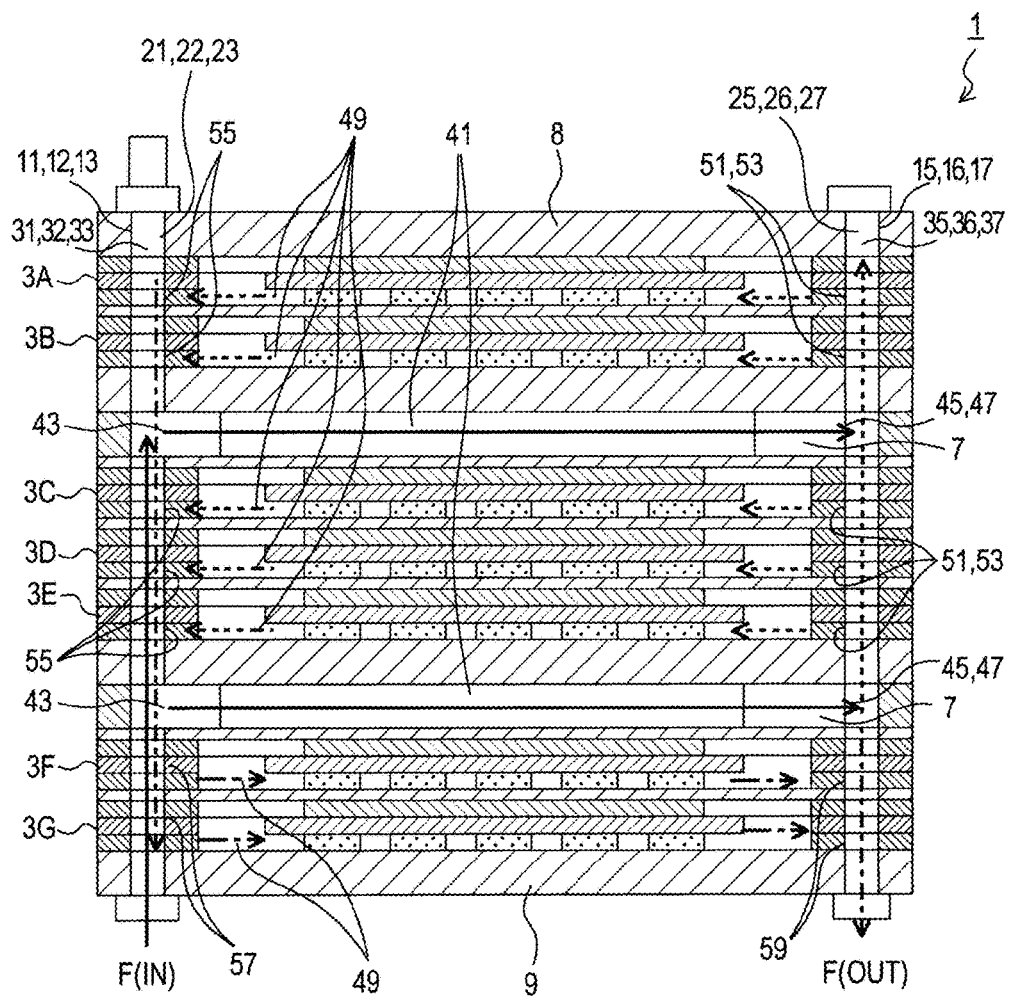
FIG. 9 Cross-sectional view showing the configuration of a fuel cell stack 1 in a second embodiment, illustrating the flow of fuel gas.
Figure 10:
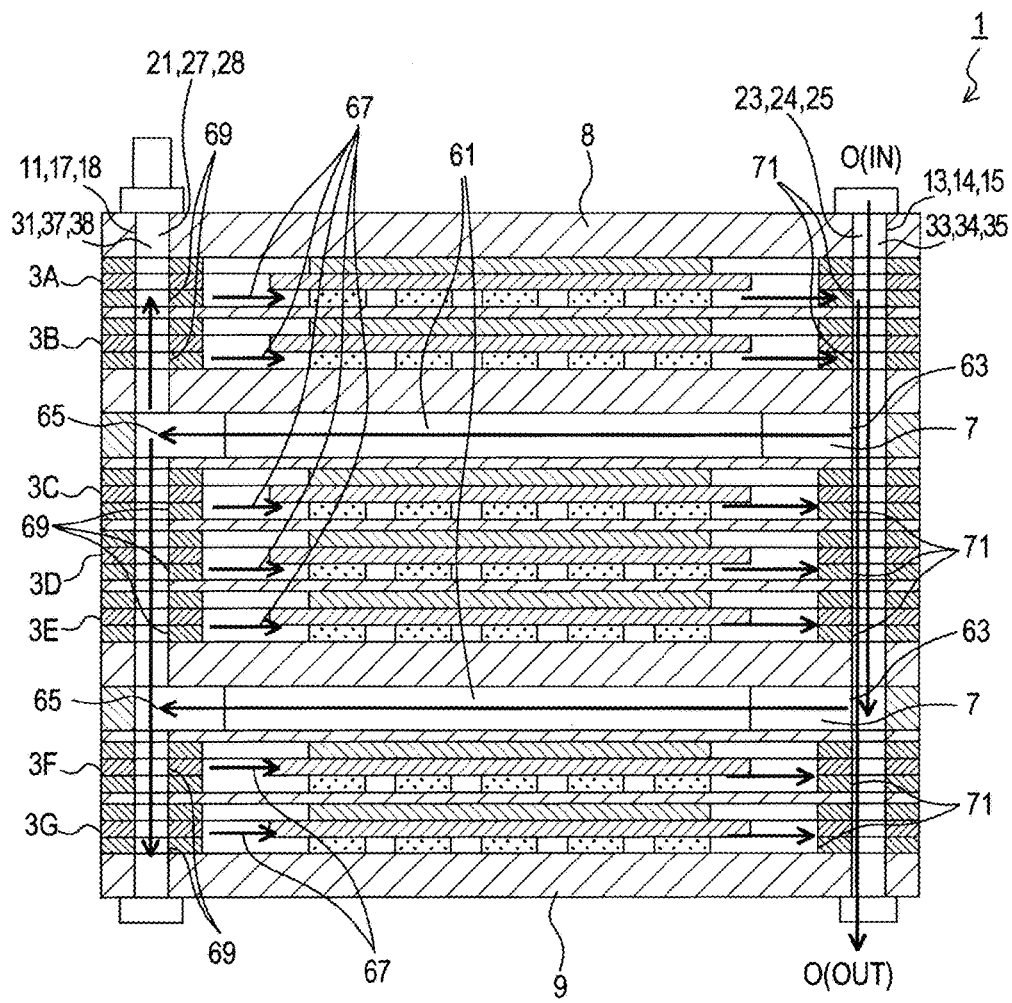
FIG. 10 Cross-sectional view showing the configuration of the fuel cell stack 1 in the second embodiment, illustrating the flow of air.

As shown in FIGS. 9 and 10, the fuel cell stack 1 includes seven power generating cells 3 and two heat exchange units 7. One of the two heat exchange units 7 is disposed between the power generating cells 3B and 3C, and the other of the two heat exchange units 7 is disposed between the power generating cells 3E and 3F.

2. Flow of Fuel Gas and Flow of Oxidant Gas

Figure 11:
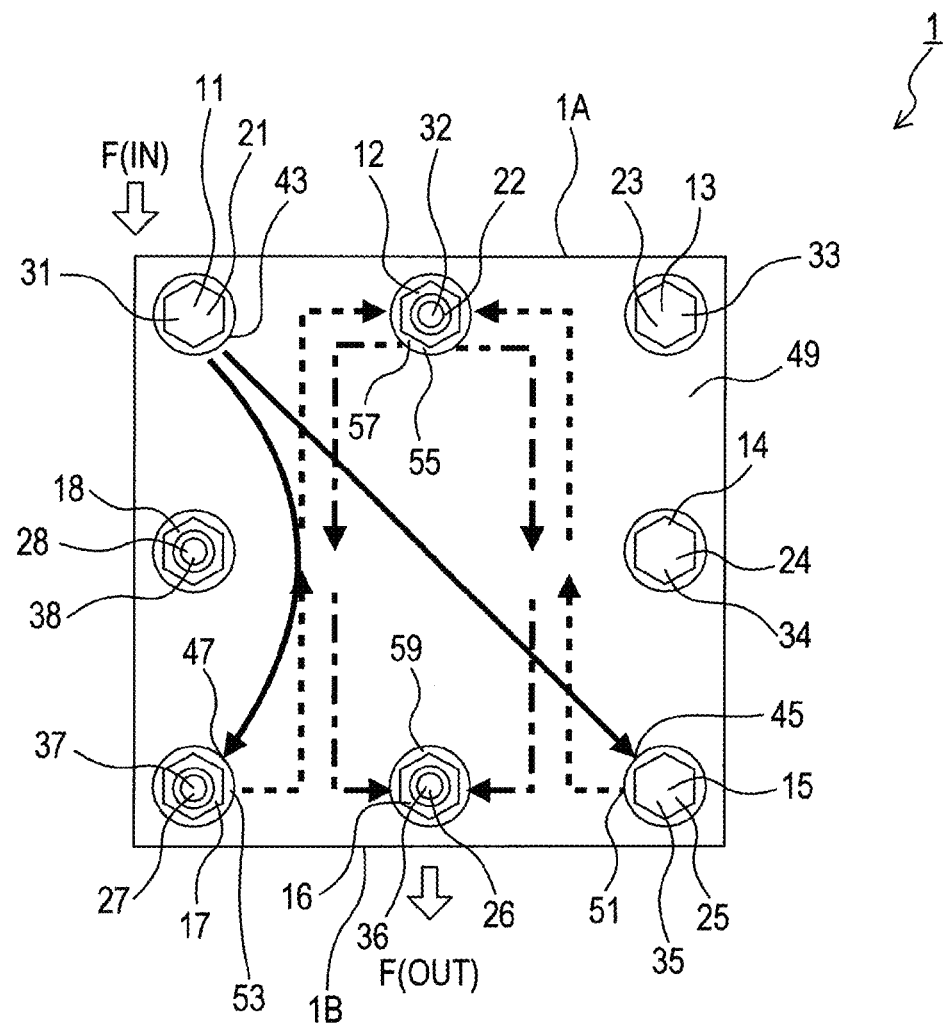
FIG. 11 Plan view showing the configuration of the fuel cell stack 1 in the second embodiment, illustrating the flow of fuel gas.

The flow of the fuel gas will first be described. As shown in FIGS. 9 and 11, the fuel gas is introduced from an end portion (denoted by F(IN) in FIGS. 9 and 11) of the passage 31 at the power generating cell 3G, passes through the passage 31, and enters the fuel gas passages 41 in the two heat exchange units 7 through the inlets 43. As shown in FIG. 9, in each of the two heat exchange units 7, the fuel gas flows inside the fuel gas passage 41, enters the passage 35 through the outlet 45, and also enters the passage 37 through the outlet 47. The inlet 43 and the outlets 45 and 47 are provided for each of the two heat exchange units 7.

As shown in FIGS. 9 and 11, the fuel gas entering the passage 35 flows inside the passage 35, passes through the five inlets 51 (i.e., is split), and enters the power generating cell-fuel gas passages 49 in the power generating cells 3A, 3B, 3C, 3D, and 3E. The fuel gas entering the passage 37 passes through the five inlets 53 and enters the power generating cell-fuel gas passages 49 in the power generating cells 3A, 3B, 3C, 3D, and 3E.

Then, as shown in FIGS. 9 and 11, the fuel gas flows in parallel through the power generating cell-fuel gas passages 49 in the power generating cells 3A, 3B, 3C, 3D, and 3E and enters the passage 32 through the outlets 55.

The fuel gas passes through the passage 32 and enters the power generating cell-fuel gas passages 49 in the power generating cells 3F and 3G through two inlets 57. Then, as shown in FIGS. 9 and 11, the fuel gas flows in parallel through the power generating cell-fuel gas passages 49 in the power generating cells 3F and 3G and enters the passage 36 through outlets 59.

Then the fuel gas is discharged from an end portion (denoted by F(OUT) in FIGS. 9 and 11) of the passage 36 at the power generating cell 3G.

Figure 12:
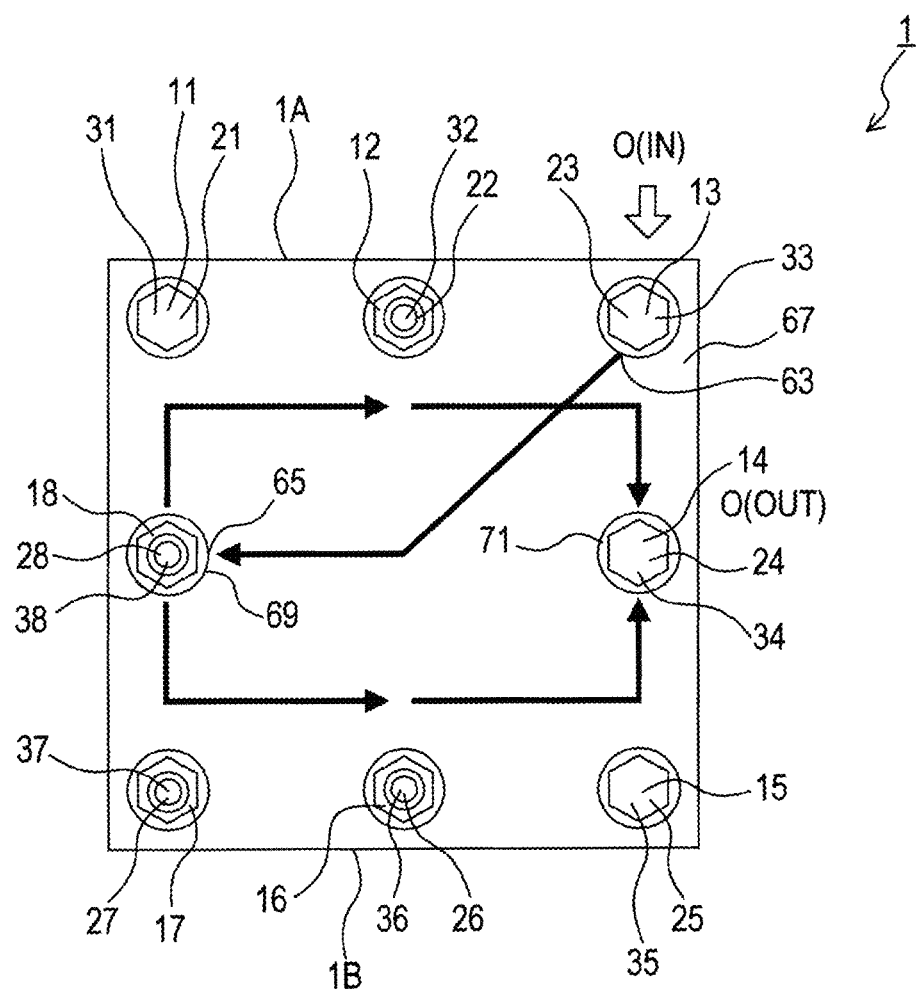
FIG. 12 Plan view showing the configuration of the fuel cell stack 1 in the second embodiment, illustrating the flow of air.

Next, the flow of air will be described. As shown in FIGS. 10 and 12, the air is introduced from an end portion (denoted by O(IN) in FIGS. 10 and 12) of the passage 33 at the power generating cell 3A, passes through the passage 33, and enters the air passages 61 in the two heat exchange units 7 through two inlets 63. Then, as shown in FIG. 10, the air flows inside the air passages 61 in the two heat exchange units 7 and enters the gas passage 38 through two outlets 65.

As shown in FIGS. 10 and 12, the air entering the gas passage 38 flows inside the gas passage 38 and enters the power generating cell-air passages 67 in the power generating cells 3 through the inlets 69. Then, as shown in FIGS. 10 and 12, the air flows in parallel through the power generating cell-air passages 67 and enters the passage 34 through the outlets 71. Then the air is discharged from an end portion (denoted by O(OUT) in FIGS. 10 and 12) of the gas passage 34 at the power generating cell 3G.

3. Effects Obtained by Fuel Cell Stack 1

The fuel cell stack 1 can provide substantially the same effects as those in the first embodiment. Since the two heat exchange units 7 are provided, the power generating cells 3 are more effectively cooled.

<Third Embodiment>

1. Configuration of Fuel Cell Stack 1

The configuration of a fuel cell stack 1 in the present embodiment is basically the same as that in the second embodiment but is partially different. The differences will be mainly described with reference to FIGS. 13 and 14, and the description of components similar to those in the second embodiment will be omitted or simplified.

Figure 13:
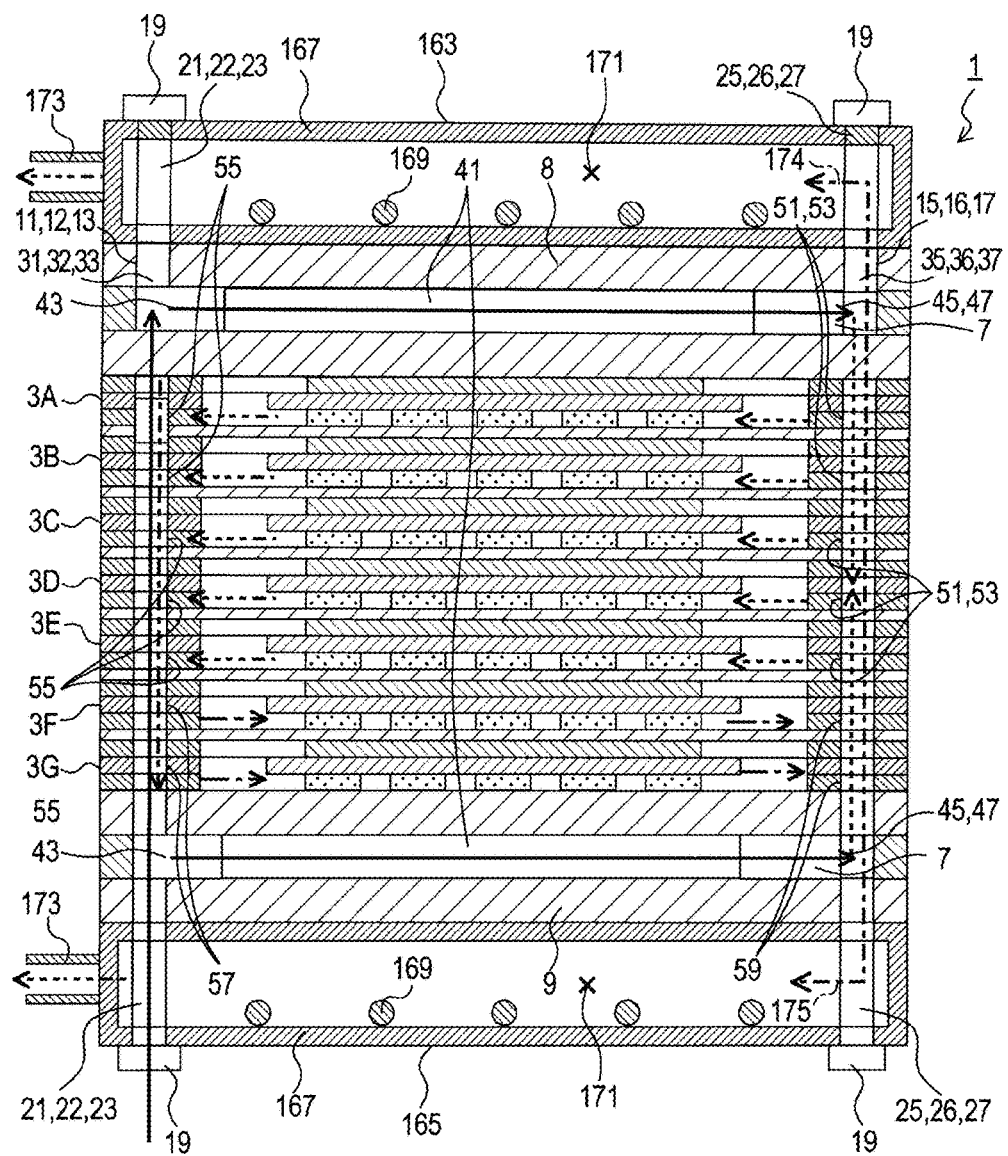
FIG. 13 Cross-sectional view showing the configuration of a fuel cell stack 1 in a third embodiment, illustrating the flow of fuel gas.
Figure 14:
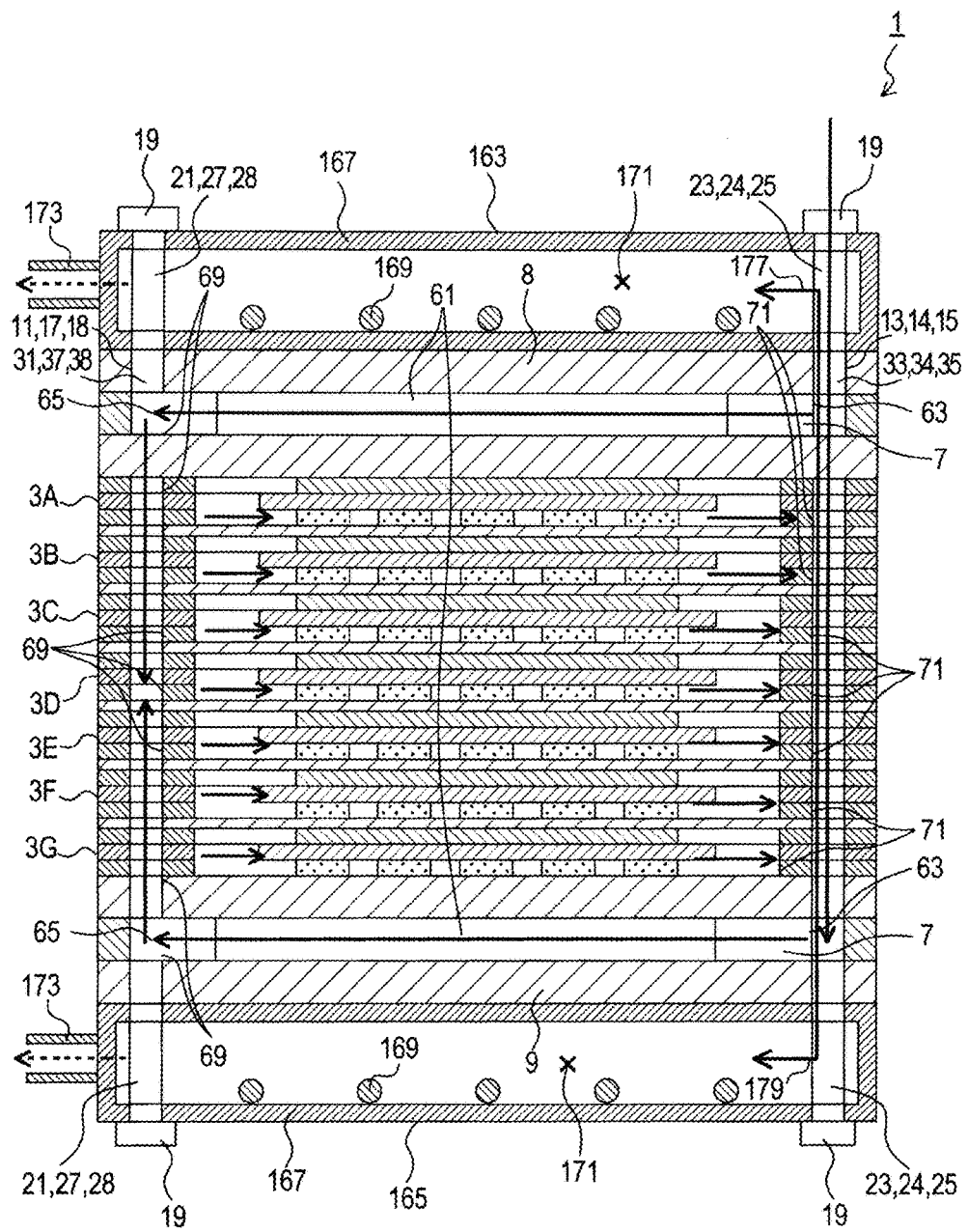
FIG. 14 Cross-sectional view showing the configuration of the fuel cell stack 1 in the third embodiment, illustrating the flow of air.

The fuel cell stack 1 includes seven power generating cells 3 and two heat exchange units 7, as shown in FIGS. 13 and 14. One of the two heat exchange units 7 is disposed between the end plate 8 and the power generating cell 3A. The other one of the two heat exchange units 7 is disposed between the end plate 9 and the power generating cell 3G. Specifically, the two heat exchange units 7 are disposed outside of power generating cells 3 located at ends in the stacking direction of the stack of the power generating cells 3 and are in contact with the power generating cells 3 located at the ends.

The fuel cell stack 1 further includes heaters 163 and 165. The heater 163 is disposed on the outer side of the end plate 8 (on the upper side in FIGS. 13 and 14) and is in contact with the end plate 8. The heater 165 is disposed on the outer side of the end plate 9 (the lower side in FIGS. 13 and 14) and is in contact with the end plate 9.

Each of the heaters 163 and 165 includes a hollow box-shaped casing 167 formed from a metal and a combustion catalyst 169 contained in the casing 167.

The holes 11 to 18 pass through the fuel cell stack 1, including the heaters 163 and 165. The bolts 21 to 28 pass through the holes 11 to 18 and extend from one end to the other end of the fuel cell stack 1, including the heaters 163 and 165. Part of the bolts 21 to 28 are present in spaces 171 inside the casings 167.

The nuts 19 are screwed onto the bolts 21 to 28 from the outer sides of the heaters 163 and 165 to thereby mutually fix the power generating cells 3, the heat exchange units 7, the end plates 8 and 9, and the heaters 163 and 165.

Each of the heaters 163 and 165 includes a discharge tube 173 on their side surface. The space 171 inside the heater 163 is in communication with the outside of the heater 163 through a discharge tube 173. The space 171 inside the heater 165 is in communication with the outside of the heater 165 through a discharge tube 173.

The bolt 26 has an outlet 174 that is a hole for connecting the space 171 inside the heater 163 to the passage 36. The bolt 26 also has an outlet 175 that is a hole for connecting the space 171 in the heater 165 to the passage 36. No holes connecting the passage 36 to the outside are provided in the bolt 26 in regions outside of the heaters 163 and 165.

The bolt 24 has an outlet 177 that is a hole for connecting the space 171 inside the heater 163 to the passage 34. The bolt 24 also has an outlet 179 that is a hole for connecting the space 171 in the heater 165 to the passage 34. No holes connecting the passage 34 to the outside are provided in the bolt 24 in regions outside of the heaters 163 and 165.

2. Flow of Fuel Gas and Flow of Oxidant Gas

The flow of the fuel gas and the flow of the oxidant gas in the present embodiment are basically the same as those in the second embodiment. However, the fuel gas passing through the power generating cells 3F and 3G and entering the passage 36 enters the heater 163 through the outlet 174 and also enters the heater 165 through the outlet 175.

The air passing through the power generating cells and entering the passage 34 enters the heater 163 through the outlet 177 and also enters the heater 165 through the outlet 179.

In the heater 163, the fuel gas introduced through the outlet 174 and the air introduced through the outlet 177 are combusted through the action of the combustion catalyst 169 or the action of contact combustion (combustion that occurs when the fuel gas and the oxidant gas come into contact with each other in a high-temperature state). The exhaust gas after combustion is discharged to the outside through the discharge tube 173. The heat generated by the combustion in the heater 163 is supplied to the power generating cells 3 through the end plate 8.

In the heater 165, the fuel gas introduced through the outlet 175 and the air introduced through the outlet 179 are combusted through the action of the combustion catalyst 169 or the action of contact combustion (combustion that occurs when the fuel gas and the oxidant gas come into contact with each other in a high-temperature state). The exhaust gas after combustion is discharged to the outside through the discharge tube 173. The heat generated by the combustion in the heater 165 is supplied to the power generating cells 3 through the end plate 9.

3. Effects Obtained by Fuel Cell Stack 1

(1) The fuel cell stack 1 can provide substantially the same effects as those in the second embodiment.

(2) Since the fuel cell stack 1 is provided with the heaters 163 and 165 at the ends of the stack of the power generating cells 3, the temperature difference between the center and the ends of the stack of the power generating cells 3 can be reduced.

(3) The fuel cell stack 1 is provided with the two heat exchange units 7 at the ends of the stack of the power generating cells 3. Therefore, the heaters 163 and 165 can be prevented from causing an excessive increase in the temperature of power generating cells 3 located at the ends of the stack.

<Fourth Embodiment>

1. Configuration of Fuel Cell Stack 1

The configuration of a fuel cell stack 1 in the present embodiment is basically the same as that in the second embodiment but is partially different. The differences will be mainly described with reference to FIGS. 15 and 16, and the description of components similar to those in the second embodiment will be omitted or simplified.

Figure 15:
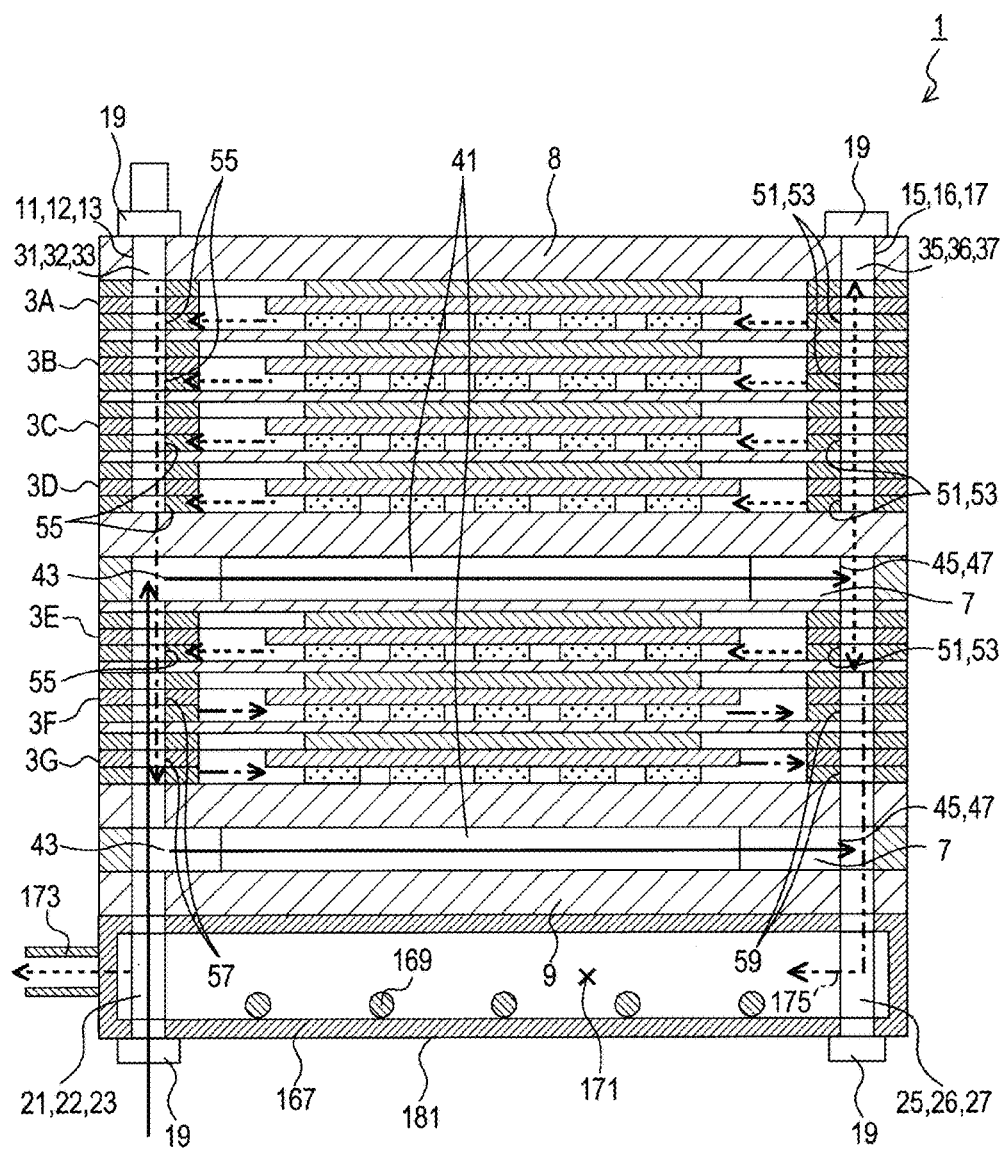
FIG. 15 Cross-sectional view showing the configuration of a fuel cell stack 1 in a fourth embodiment, illustrating the flow of fuel gas.
Figure 16:
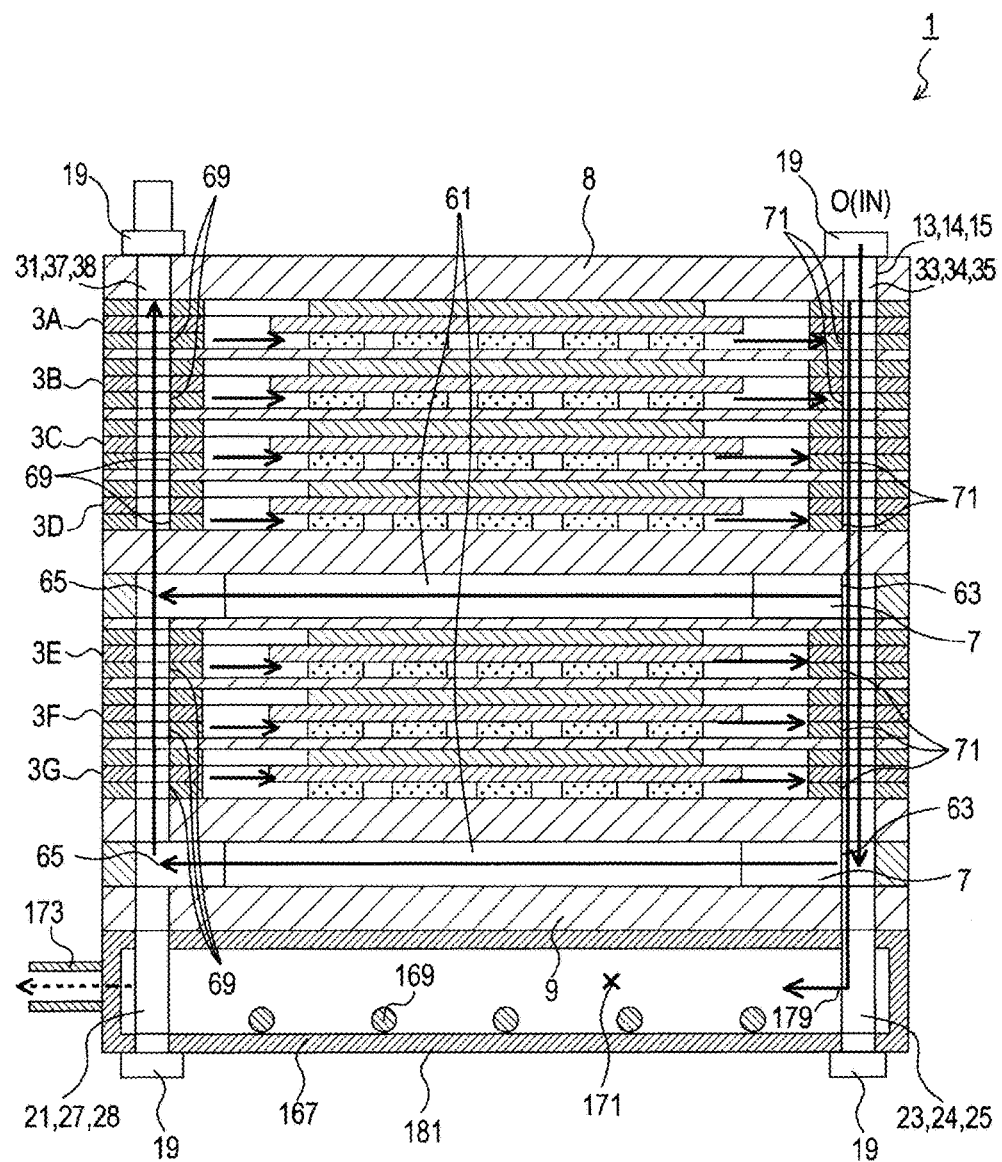
FIG. 16 Cross-sectional view showing the configuration of the fuel cell stack 1 in the fourth embodiment, illustrating the flow of air.

The fuel cell stack 1 includes seven power generating cells 3 and two heat exchange units 7 as shown in FIGS. 15 and 16. One of the two heat exchange units 7 is disposed between the power generating cell 3D and the power generating cells 3E. The other one of the two heat exchange units 7 is disposed between the end plate 9 and the power generating cell 3G. Specifically, one of the two heat exchange units 7 is disposed near the center of the stack of the power generating cells 3, and the other one is disposed outside of a power generating cell 3 located at an end in the stacking direction of the stack of the power generating cells 3 and is in contact with the power generating cell 3 located at the end.

The fuel cell stack 1 further includes a heater 181. The heater 181 is disposed on the outer side of the end plate 9 (on the lower side in FIGS. 15 and 16) and is in contact with the end plate 9.

The heater 181 includes a hollow box-shaped casing 167 formed from a metal and a combustion catalyst 169 contained in the casing 167.

The holes 11 to 18 pass through the fuel cell stack 1, including the heater 181. The bolts 21 to 28 pass through the holes 11 to 18 and extend from one end to the other end of the fuel cell stack 1, including the heater 181. Part of the bolts 21 to 28 are present in an inner space 171 of the casing 181.

The nuts 19 are screwed onto the bolts 21 to 28 from the outer sides of the heater 181 and the end plate 8 to thereby mutually fix the power generating cells 3, the heat exchange units 7, the end plates 8 and 9, and the heater 181.

The heater 181 includes a discharge tube 173 on its side surface. The space 171 inside the heater 181 and the outside of the heater 181 are in communication with each other through the discharge tube 173.

The bolt 26 has an outlet 175 that is a hole for connecting the space 171 inside the heater 181 to the passage 36. No hole connecting the passage 36 to the outside is provided in the bolt 26 in a region outside of the heater 181.

The bolt 24 has an outlet 179 that is a hole for connecting the space 171 in the heater 181 to the passage 34. No hole connecting the passage 34 to the outside is provided in the bolt 24 in a region outside of the heater 181.

2. Flow of Fuel Gas and Flow of Oxidant Gas

The flow of the fuel gas and the flow of the oxidant gas in the present embodiment are basically the same as those in the second embodiment. However, the fuel gas passing through the power generating cells 3F and 3G and then entering the passage 36 enters the heater 181 through the outlet 175. The air passing through the power generating cells and then entering the passage 34 enters the heater 181 through the outlet 179.

In the heater 181, the fuel gas introduced through the outlet 175 and the air introduced through the outlet 179 are combusted through the action of the combustion catalyst 169 or the action of contact combustion (combustion that occurs when the fuel gas and the oxidant gas come into contact with each other in a high-temperature state). The exhaust gas after combustion is discharged to the outside through the discharge tube 173. The heat generated by the combustion in the heater 181 is supplied to the power generating cells 3 through the end plate 9.

3. Effects Obtained by Fuel Cell Stack 1

(1) The fuel cell stack 1 can provide substantially the same effects as those in the second embodiment.

(2) Since the fuel cell stack 1 is provided with the heater 181 at an end of the stack of the power generating cells 3, the temperature difference between the center and the end of the stack of the power generating cells 3 can be reduced.

(3) The fuel cell stack 1 is provided with one heat exchange unit 7 disposed at an end of the stack of the power generating cells 3, the end being located on the side toward the heater 181. Therefore, the heater 181 can be prevented from causing an excessive increase in the temperature of the power generating cell 3 located at the end of the stack.

(4) The fuel cell stack 1 is provided with one heat exchange unit 7 disposed near the center of the stack of the power generating cells 3. Therefore, the power generating cells 3 can be effectively cooled.

<Other Embodiments>

(1) The number of power generating cells 3 provided in the fuel cell stacks 1 in the first to fourth embodiments is not limited to 7 and 8 and may be set appropriately. The number of heat exchange units 7 provided in the fuel cell stacks 1 is not limited to 1 and 2 and may be set appropriately.

(2) In the fuel cell stack 1 in each of the first to fourth embodiments, the position of each heat exchange unit 7 in the stacking direction may be the center of the fuel cell stack 1 or near an end of the fuel cell stack 1.

(3) In the fuel cell stack 1 in each of the first to fourth embodiments, the positional relation between the inlets 51 and 53 and the outlets 59 is not limited to that described above. For example, when the fuel cell stack 1 is viewed in the stacking direction, the position of the outlets 59 may be located equidistant from the inlets 51 and 53 or may be located closer to one of the inlets 51 and 53. The position of the outlets 59 may be located on a line connecting the inlets 51 and 53 or may be located off the line.

The position of the outlets 55 and the inlets 57 is also not limited to that described above. For example, when the fuel cell stack 1 is viewed in the stacking direction, the position of the outlets 55 and the inlets 57 may be located equidistant from the bolts 21 and 23 or may be located closer to one of the bolts 21 and 23. The position of the outlets 55 and the inlets 57 may be located on a line connecting the bolts 21 and 23 or may be located off the line.

(4) The fuel cell stack 1 in each of the first and second embodiments may further include a heater similar to those in the third and fourth embodiments. In such a case, the heater may be disposed on one side or both sides of the stack of the power generating cells 3. The fuel cell stack 1 in the fourth embodiment may be provided with heaters on both sides of the stack of the power generating cells 3, as in the third embodiment.

(5) The fuel cell stack 1 in each of the third and fourth embodiments may include no heaters. The fuel cell stack 1 in the third embodiment may include only one heater.

(6) The fuel cell stack 1 in each of the third and fourth embodiments may include only one heat exchange unit 7. The heat exchange unit 7 may be located at an end of the stack of the power generating cells 3 (a position between the end plate 8 and the power generating cell 3A or between the end plate 9 and the power generating cell 3G) or at a position near the center of the stack of the power generating cells 3.

(7) The heat exchange unit 7 in the fuel cell stack 1 in the first embodiment may be located at an end of the stack of the power generating cells 3 (a position between the end plate 8 and the power generating cell 3A or between the end plate 9 and the power generating cell 3H).

(8) One or both of the heat exchange units 7 in the fuel cell stack 1 in the second embodiment may be located at the ends of the stack of the power generating cells 3 (a position between the end plate 8 and the power generating cell 3A and a position between the end plate 9 and the power generating cell 3G).

(9) In the above embodiments, the fuel gas passages in the fuel cell stack are cavities formed inside the bolts (hollow bolts), but this is not a limitation. The passages of the fuel gas may be formed externally of the outer surfaces of solid bolts (bolts with no inner cavities). Solid bolts and hollow bolts may be used in combination in the fuel cell stack.

The present invention is not limited to the embodiments described above, and it will be appreciated that the present invention can be implemented in various forms without departing from the spirit of the invention.

The invention claimed is:

1. A fuel cell stack comprising: a plurality of power generating cells stacked on one another;
a heat exchange unit disposed between two of the power generating cells which are located adjacent to each other;
a fuel gas supply path for supplying fuel gas to the power generating cells; and
an oxidant gas supply path for supplying oxidant gas to the power generating cells, wherein
the fuel gas supply path includes, in series, a first path passing through the heat exchange unit, a second path passing in parallel through some of the plurality of power generating cells, and a third path passing in parallel through the remaining power generating cells;
in the second path, when the power generating cells are viewed in a stacking direction thereof, two inlets of the fuel gas in each of the some power generating cells are located at a first position PA and a second position PB along one side of each power generating cell, and one outlet of the fuel gas in each of the some power generating cells is located at a third position PC along another side of each power generating cell that is opposite the one side; and
in the third path, when the power generating cells are viewed in the stacking direction, an inlet of the fuel gas in each of the remaining power generating cells is located at a position coinciding with the third position PC, and an outlet of the fuel gas in each of the remaining power generating cells is located at a position between the first position PA and the second position PB.

2. A fuel cell stack comprising:
a plurality of power generating cells stacked on one another;
a heat exchange unit disposed at at least one of a position between two of the power generating cells which are located adjacent to each other and a position outside of one of the plurality of power generating cells that is located at an end in a stacking direction of the power generating cells;
a fuel gas supply path for supplying fuel gas to the power generating cells; and an oxidant gas supply path for supplying oxidant gas to the power generating cells, wherein the fuel gas supply path includes, in series, a first path passing through the heat exchange unit, a second path passing in parallel through some of the plurality of power generating cells, and a third path passing in parallel through the remaining power generating cells;

in the second path, when the power generating cells are viewed in a stacking direction thereof, two inlets of the fuel gas in each of the some power generating cells are located at a first position PA and a second position PB located along one side of each power generating cell, and one outlet of the fuel gas in each of the some power generating cells is located at a third position PC along another side of each power generating cell that is opposite the one side; and in the third path, when the power generating cells are viewed in the stacking direction, an inlet of the fuel gas in each of the remaining power generating cells is located at a position coinciding with the third position PC, and an outlet of the fuel gas in each of the remaining power generating cells is located at a position between the first position PA and the second position PB.

3. A fuel cell stack according to claim 1, wherein
a plurality of the heat exchange units are provided; and
in the first path, the fuel gas flows in parallel through the plurality of heat exchange units.

4. A fuel cell stack according to claim 1, wherein
the fuel gas supply path comprises a plurality of fuel gas passages extending within the fuel cell stack in the stacking direction, and connection ports that connect the fuel gas passages to the heat exchange unit and interiors of at least some of the plurality of power generating cells; and
the inlets and the outlets are part of the connection ports.

5. A fuel cell stack according to claim 4, further comprising a plurality of bolts passing through the fuel cell stack in the stacking direction and used to fix the plurality of power generating cells and the heat exchange unit, wherein the plurality of fuel gas passage are cavities formed inside the plurality of bolts.

6. A fuel cell stack according to claim 1, wherein, when the power generating cells are viewed in the stacking direction, the distance from the first position PA to the third position PC and the distance from the second position PB to the third position PC are substantially the same.

7. A fuel cell stack according to claim 2, wherein
a plurality of the heat exchange units are provided; and
in the first path, the fuel gas flows in parallel through the plurality of heat exchange units.

8. A fuel cell stack according to claim 2, wherein
the fuel gas supply path comprises a plurality of fuel gas passages extending within the fuel cell stack in the stacking direction, and connection ports that connect the fuel gas passages to the heat exchange unit and interiors of at least some of the plurality of power generating cells; and
the inlets and the outlets are part of the connection ports.

9. A fuel cell stack according to claim 8, further comprising a plurality of bolts passing through the fuel cell stack in the stacking direction and used to fix the plurality of power generating cells and the heat exchange unit, wherein the plurality of fuel gas passage are cavities formed inside the plurality of bolts.

10. A fuel cell stack according to claim 2, wherein, when the power generating cells are viewed in the stacking direction, the distance from the first position PA to the third position PC and the distance from the second position PB to the third position PC are substantially the same.

* * * * *